United States Patent
Ranganathan (10) Patent No.: US 7,788,405 B2
(45) Date of Patent: Aug. 31, 2010

(54) METHOD FOR AUTOMATIC CONFIGURATION OF PREFIXES AT MAPS IN HMIPV6

(75) Inventor: Vijayarajan Ranganathan, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 964 days.

(21) Appl. No.: 11/529,768

(22) Filed: Sep. 29, 2006

(65) Prior Publication Data

US 2007/0088708 A1    Apr. 19, 2007

(30) Foreign Application Priority Data

Oct. 6, 2005    (IN) .................. 1423/CHE/2005

(51) Int. Cl.
    *G06F 15/173* (2006.01)
(52) U.S. Cl. .................. 709/242; 370/331; 370/338; 370/401; 370/421
(58) Field of Classification Search .............. 709/220, 709/242; 370/331, 338, 401
    See application file for complete search history.

(56) References Cited

U.S. PATENT DOCUMENTS

| | | | | |
|---|---|---|---|---|
| 6,947,401 | B2* | 9/2005 | El-Malki et al. | 370/331 |
| 7,031,328 | B2* | 4/2006 | Thubert et al. | 370/401 |
| 7,313,119 | B2* | 12/2007 | Suh et al. | 370/338 |
| 7,602,747 | B2* | 10/2009 | Maksymczuk et al. | 370/331 |
| 2001/0046223 | A1* | 11/2001 | Malki et al. | 370/338 |
| 2004/0179539 | A1* | 9/2004 | Takeda et al. | 370/401 |
| 2005/0120136 | A1* | 6/2005 | Park et al. | 709/242 |

* cited by examiner

*Primary Examiner*—Dustin Nguyen
(74) *Attorney, Agent, or Firm*—NSIP Law (57) ABSTRACT

A method for automatic configuration of prefixes at MAPS in HMIPv6 and MIPv6 is providedwhere it is related to the configuration of valid on-link prefixes at MAPs in HMIPv6 and to DHCPv6. Additionally, there is provided a method for providing automatic configuration of prefixes at all MAPs in a communication system comprising Mobility Anchor Point (MAP) Domains and within each MAP Domain, a Leader MAP, a DHCPV6 Server and possibly other MAP(s). The method comprises configuring the anycast address of Leader MAP for that MAP Domain, configuring the list of valid on-link prefixes of border ARs for that MAP Domain, configuring the anycast addresses of Leader MAPs in neighboring MAP Domains, processing a request for MAP Domain Info option and sending a reply with MAP Domain Info option, at DHCPV6 Server.

33 Claims, 7 Drawing Sheets

| 1 | 2 | 3 | 4 |
|---|---|---|---|
| MAP Domain Prefixes Option Code || Option Len ||
| Prefix 1 (Prefix option) ||||
| Prefix 2 (Prefix option) ||||
| ... ||||

FIG. 6

| 1 | 2 | 3 | 4 |
|---|---|---|---|
| Neighbor Domain Anycast Option Code | | Option Len | |
| Anycast address of Leader MAP in Neighbor Domain 1 (Prefix option) | | | |
| Anycast address of Leader MAP in Neighbor Domain 2 (Prefix option) | | | |
| ... | | | |

FIG. 7

| 1 | 2 | 3 | 4 |
|---|---|---|---|
| Prefix Option Code || Option Len ||
| Prefix Length | Reserved |||
| IPv6 Prefix ||||

METHOD FOR AUTOMATIC CONFIGURATION OF PREFIXES AT MAPS IN HMIPV6

CROSS-REFERENCE TO RELATED APPLICATIONS

This application claims the benefit under 35 U.S.C. §119(a) of a Indian Patent Application No. 1423/CHE/2005, filed on Oct. 5, 2005, in Indian Patent and Trademark Office, the entire disclosure of which is hereby incorporated by reference.

BACKGROUND OF THE INVENTION

1. Field of the Invention

This invention relates to MIPv6 and HMIPv6 technologies. Specifically, the invention relates to the configuration of valid on-link prefixes at MAPs in HMIPv6. It is also related to DHCPv6. More particularly, the present invention relates to a method for automatic configuration of prefixes at maps in HMIPv6.

2. Description of Related Art

Currently, the list of valid on-link prefixes of border ARs in neighboring MAP domains is configured manually at the MAPs. However, there are many drawbacks in manually configuring the prefixes at MAPs. There may be many MAPs within a MAP domain. All the MAPs have to be manually configured with the list of valid on-link prefixes of ARs in neighboring MAP domains. Again, within each MAP domain, prefixes for all neighboring MAP domains have to be manually configured. If the list of prefixes at a MAP domain changes, for example, site-renumbering, this change has to be reflected in all neighboring MAP domains.

Accordingly, a need exists for an improved method for providing automatic configuration of prefixes at all MAPs in a communication system comprising Mobility Anchor Point (MAP) Domains and within each MAP Domain, a Leader MAP, a DHCPV6 Server and possibly other MAP(s).

SUMMARY OF THE INVENTION

Accordingly, the present invention has been made to address the above-mentioned problems, and an object of the present invention is to provide a method for configuring the list of valid on-link prefixes at MAPs.

In HMIPv6, when MN moves from one MAP domain to another, it may update the previous MAP (asking it to forward packets to its new LCoA) for smooth inter-MAP handover. The HMIPv6 draft RECOMMENDS that MAPs be allowed to forward packets to LCoAs associated with some of the ARs in neighboring MAP domains. The draft further says that a MAP may be configured with this list of valid on-link prefixes that mobile nodes can use to derive LCoAs. Currently, this list of prefixes is manually configured.

In an exemplary embodiment of the present invention, for each MAP domain, the list of valid on-link prefixes of border ARs for that domain is configured in DHCPv6 server. A certain MAP in the domain, designated as Leader MAP, obtains this prefix list through DHCPv6. It then sends this prefix list to Leader MAPs in neighboring MAP domains. Leader MAPs of neighboring MAP domains, in turn, multicast the list to all the MAPs in their respective domains.

With regard to an exemplary embodiment of the present invention, all the MAPs within a MAP domain need not be configured with the prefix list. The list is configured only at one place, in the DHCPv6 server. For a MAP domain, if there are p prefixes (for border ARs) within the domain and there are n neighboring domains, manual configuration requires p prefixes to be configured in n domains. In our method, p prefixes are configured at only one domain. If the list of valid on-link prefixes at a MAP domain changes, for example, site-renumbering, it has to be changed in only one place, at the DHCPv6 server.

Accordingly, an exemplary embodiment of the present invention discloses a method for providing automatic configuration of prefixes at all MAPs in a communication system comprising Mobility Anchor Point (MAP) Domains and within each MAP Domain, a Leader MAP, a DHCPV6 Server and possibly other MAP(s). The method comprises, at DHCPV6 Server, configuring the anycast address of Leader MAP for the MAP Domain, configuring the list of valid on-link prefixes of border ARs for that MAP Domain, configuring the anycast addresses of Leader MAPs in neighboring MAP Domains, and processing a request for MAP Domain Info option and sending a reply with MAP Domain Info option. The method further comprises, at leader MAPs, requesting MAP Domain Info option from DHCPV6 server, assigning itself anycast address to itself the anycast address being obtained through DHCPV6, sending the list of valid on-link prefixes to Leader MAPs in all neighboring MAP domains, multicasting the prefix list, and obtained through DHCPV6 or from other Leader MAPs, to all other MAPs within the domain. The method further comprises, at other MAPs, joining the well-known multicast address for its MAP Domain, and receiving prefix lists from their Leader MAP and storing the prefix lists.

Every MAP domain is assigned some anycast address and well-known MAP multicast address. One MAP in every MAP domain is designated as "Leader MAP". The DHCP Info-Reply with MAP Domain Info option contains anycast address of the "Leader MAP". The DHCP Info-Reply with MAP Domain Info option contains the list of valid on-link prefixes of border ARs in the said MAP domain. The DHCP Info-Reply with MAP Domain Info option contains anycast addresses of "Leader MAPs" in neighboring MAP domains. The "Leader MAP" assigns itself the anycast address, when not assigned already. The "Leader MAP" then unicasts the list of prefixes to Leader MAPs in all neighboring MAP domains. Leader MAPs in neighboring domains, in order, multicast the prefixes to their domain's well-known MAP multicast address. All MAPs in neighboring MAP domain receive the list of prefixes as the said MAPs listen on their domain's well-known multicast address. All MAPs within a given MAP domain receive the list of valid on-link prefixes of ARs in all other neighboring MAP domains. All MAPs combine all the prefixes to form the list of valid on-link prefixes of border ARs in all neighboring MAP domains.

The DHCPv6 options are defined to carry all the configuration information from DHCPv6 server where the said options are MAP Domain Info Option, MAP Domain Anycast Option, MAP Domain Prefixes Option, Neighbor Domain Anycast Option, Prefix Option along with Security Considerations. The option of MAP Domain Info Option is used to carry Leader MAP's anycast address, list of valid on-link prefixes of border ARs and anycast addresses of Leader MAPs in neighboring MAP domains.

The said option of MAP Domain Info Option includes fields such as MAP Domain Info Option Code which indicates OPTION_MDIOC, Option Len which indicates number of bytes in the option, excluding the Option Code and Option Len fields, MAP Domain Anycast Option which carries anycast address of Leader MAP, MAP Domain Prefixes Option which carries list of valid onlink prefixes of border ARs and Neighbor Domain Anycast Option which carries anycast addresses of Leader MAPs in all neighbor domains. The Option of MAP Domain Anycast Option is used to carry the Anycast Address of Leader MAP in a MAP Domain. The said option of MAP Domain Anycast Option includes fields such as MAP Domain Anycast Option Code which indicates OPTION_MDAOC, Option Len which indicates the number of bytes in the option, excluding the Option Code and Option Len fields and Leader MAP's anycast address which indicates Anycast address that Leader MAP should assign itself.

The said option of MAP Domain Prefixes Option is used to carry the list of valid prefixes of border ARs in a MAP Domain. The said option of MAP Domain Prefixes Option includes fields such as MAP Domain Prefixes Option Code which indicates OPTION_MDPOC, Option Len which indicates the number of bytes in the option, excluding the Option Code and Option Len fields and plurality of Prefix which indicates Valid on-link prefix of border ARs in the MAP domain that is used by Mobile Nodes to configure LcoAs. The said option of Neighbor Domain Anycast Option is used to carry anycast address of "Leader MAPs" in neighboring MAP Domains. The said option of Neighbor Domain Anycast Option includes fields such as Neighbor Domain Anycast Option Code which indicates OPTION_NDAOC, Option Len which indicates number of bytes in the option, excluding the Option Code and Option Len fields and plurality of Anycast addresses which indicates Anycast addresses of Leader MAPs in neighboring MAP domains. The said option of Prefix Option is used to carry an IPv6 prefix. The said option of Prefix Option includes fields such as Prefix Option Code which indicates OPTION_POC , Option Len which equals 18 bytes Prefix Length which indicates Length for this prefix in bits, Reserved field which indicates reserved for future use and IPv6 Prefix which is an IPv6 prefix. The said Security Considerations includes three message exchanges such as DHCPV6 Info-Req and Info-Response to get MAP-LCoA option, Unicast messages from "Leader MAP" to "Leader MAPs" in neighboring domains and Multicast message from "Leader MAP" in neighboring domains to other MAPs in the same domain. The DHCPv6 messages are secured through Delayed Authentication protocol and the DHCPV6 server is in the same administrative domain as the MAP obtaining information from the DHCPV6 server.

The method further comprises configuring the Leader MAP's anycast address, ≙list of valid on-link prefixes of border ARs and anycast addresses of Leader MAPs of neighboring MAP Domains in MAP Domain Info option. The method further comprises configuring the anycast address of Leader MAP for that MAP Domain in MAP Domain Anycast option. The method further comprises configuring the list of all valid prefixes of border ARs within the MAP Domain in MAP Domain Prefixes option. The method further comprises configuring anycast addresses of Leader MAPs in neighboring MAP Domains in Neighbor Domain Anycast option. The obtaining MAP Domain Info option comprises Leader MAP sending DHCPV6 Info-Request message and receiving DHCPV6 Info-Reply.

The method further comprises Leader MAP assigning itself the anycast address contained in MAP Domain Anycast option. The sending list of valid on-link prefixes comprises extracting anycast addresses of Leader MAPs in neighboring MAP Domains from Neighbor Domain Anycast option, extracting the list of valid on-link prefixes of border ARs in the MAP Domain from MAP Domain Prefixes option, and sending the prefix list to anycast addresses of Leader MAPs of neighbor MAP Domains.

These and other objects, features and advantages of the present invention will become more readily apparent from the detailed description taken in conjunction with the drawings and the claims.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In an exemplary implementation of the present invention with regard to HMIPv6, when a mobile node moves into a new MAP domain, the mobile node may send a Binding Update to the previous MAP requesting it to forward packets addressed to the mobile node's new CoA. It is RECOMMENDED that MAPs be allowed to forward packets to LCoAs associated with some of the ARs in neighboring MAP domains, provided that they are located within the same administrative domain. For instance, a MAP could be configured to forward packets to LCoAs associated with ARs that are geographically adjacent to ARs on the boundary of its domain. This will allow for a smooth inter-MAP handover as it allows the mobile node to continue to receive packets while updating the new MAP, it's HA and, potentially, correspondent nodes.

The HMIPv6 draft also says that a MAP may be configured with the list of valid on-link prefixes that mobile nodes can use to derive LCoAs. If a mobile node sent a binding update containing an LCoA that is not in the MAP's "valid on-link prefixes" list, the MAP could reject the binding update. Currently, this list of prefixes is manually configured at the MAPs.

Figure 1:
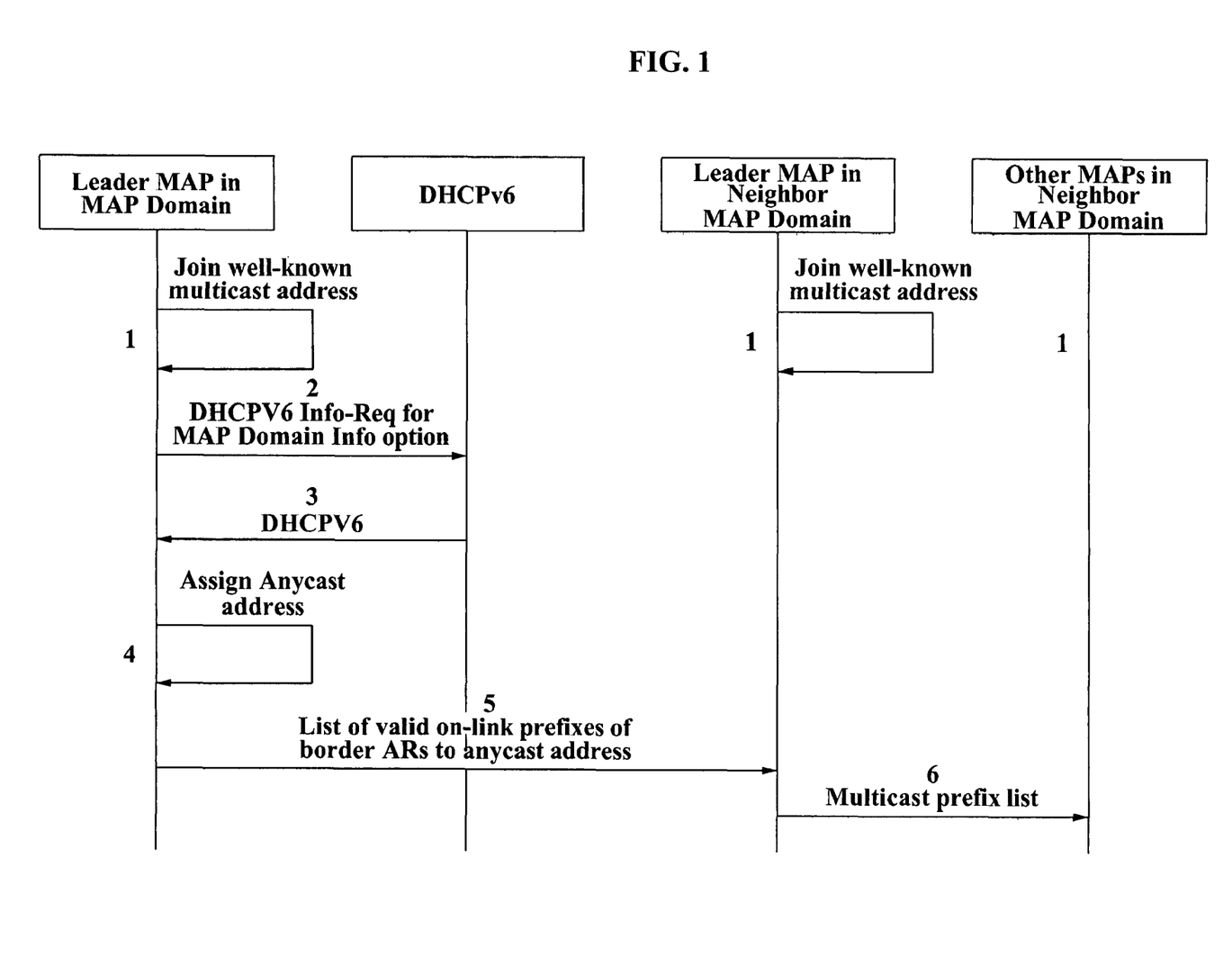
FIG. 1 illustrates an exemplary embodiment of the present invention shown in a sequence of steps.

An exemplary embodiment of the present invention proposes an automatic method of configuring this list of valid on-link prefixes (that mobile nodes can use to derive LCoAs) at the MAPs. FIG. 1 shows the different entities involved. Every MAP domain has a set of one or more MAPs and one or more ARs. Each MAP domain also has some neighboring MAP domains, which are geographically adjacent to it. When a mobile node moves out of a MAP domain, it will move into one of the neighboring MAP domains. For simplicity, it may be assumed that all the MAP domains are within the same administrative domain. It is also assumed that there is a DHCPv6 server for the MAP domain.

The current method comprises the following sequence of steps. The important ones are shown in FIG. 1. The method is explained with the MAP domain named as "MAP Domain" in FIG. 2 as the reference.

Figure 2:
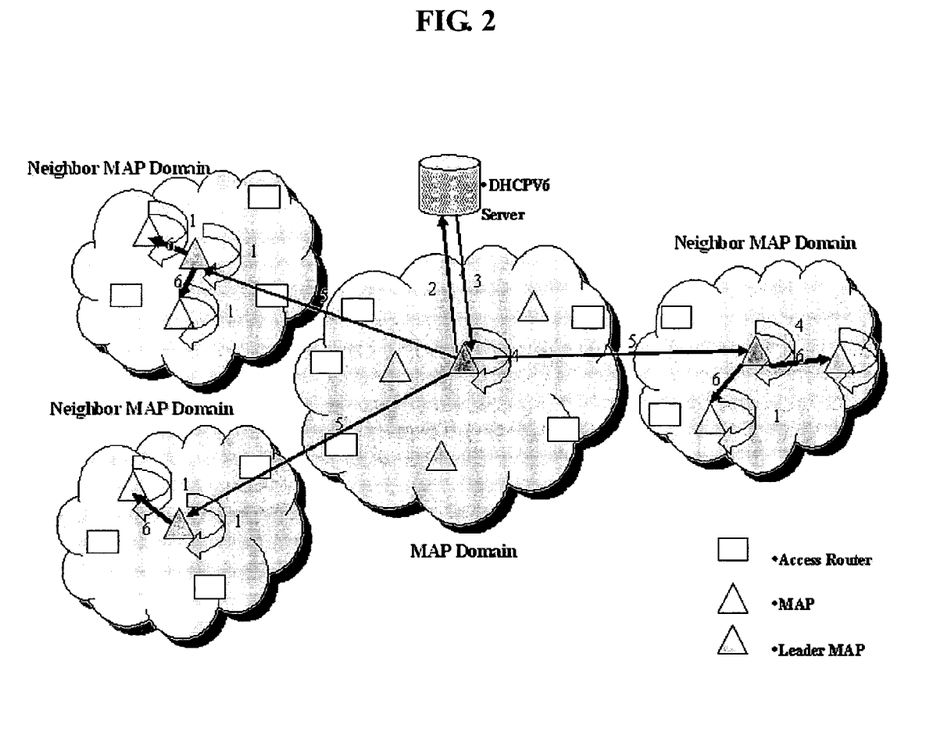
FIG. 2 illustrates the different entities involved and how they interact according to an exemplary embodiment of the present invention.

The MAP domain named as "MAP Domain" in FIG. 2 is referred to as "The MAP Domain" or "This MAP Domain" in the steps below. The MAP domains named as "Neighbor MAP Domain" are the neighboring MAP domains. Every MAP domain is assigned some anycast address and well-known MAP multicast address. One MAP in every MAP domain is designated as "Leader MAP". For example: a MAP with a greatest distance in distance field of MAP option may be designated as "Leader MAP". This could be the MAP at the top of the hierarchy of MAPs. There can be other criteria for electing the "Leader MAP". The list of valid on-link prefixes of border ARs in this MAP domain, anycast address of "Leader MAP of this domain and anycast addresses of "Leader MAPs" in neighboring MAP domains are configured In DHCPv6 server. Initially, all MAPs in the MAP domain and neighboring MAP domains join the well-known multicast address for that respective domain. At periodic intervals, "Leader MAP" in the MAP domain, requests MAP Domain Info option through DHCPv6 Info-Req message from DHCPv6 server. The DHCP Info-Reply with MAP Domain Info option contains information, such as Anycast address of "Leader MAP", List of valid on-link prefixes of border ARs in this MAP domain, and Anycast addresses of "Leader MAPs" in neighboring MAP domains.

The "Leader MAP" assigns itself the anycast address, if not assigned already. The "Leader MAP" then unicasts the list of prefixes to Leader MAPs in all neighboring MAP domains. Leader MAPs in neighboring domains, in turn, multicast the prefixes to their domain's well-known MAP multicast address.

Since all MAPs in neighboring MAP domain are listening on their domain's well-known multicast address, all of them receive the list of prefixes. In this manner, all the MAPs within a given MAP domain receive the list of valid on-link prefixes of ARs in all other neighboring MAP domains. They combine all these prefixes to form the list of valid on-link prefixes of border ARs in all neighboring MAP domains.

To carry all the configuration information from DHCPv6 server, the following DHCPv6 options are defined.

MAP Domain Info Option

Figure 3:
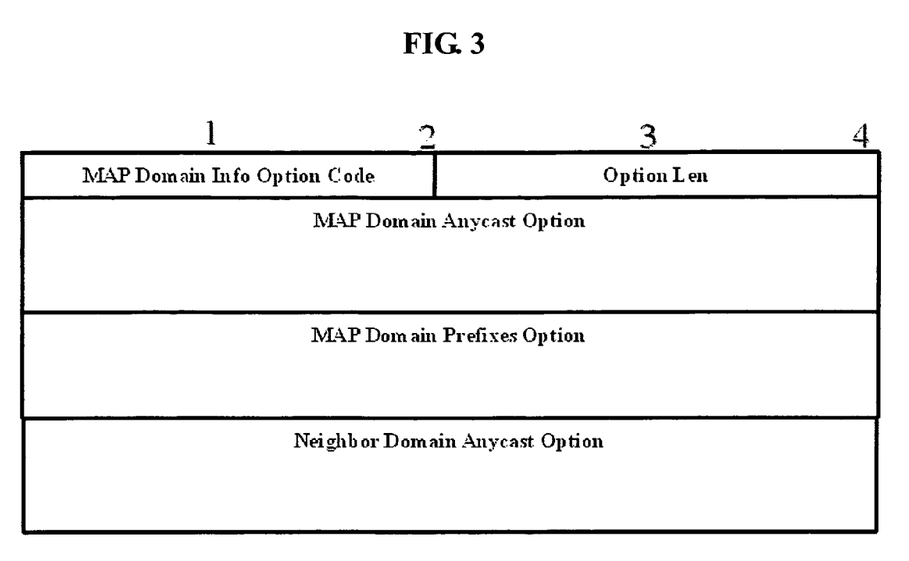
FIG. 3 illustrates MAP domain information option an exemplary embodiment of the present invention.
Figure 4:
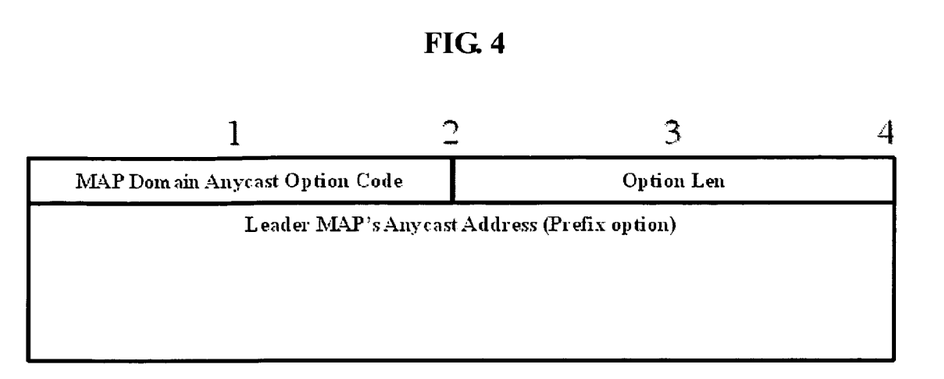
FIG. 4 illustrates MAC domain anycast option an exemplary embodiment of the present invention.
Figure 5:
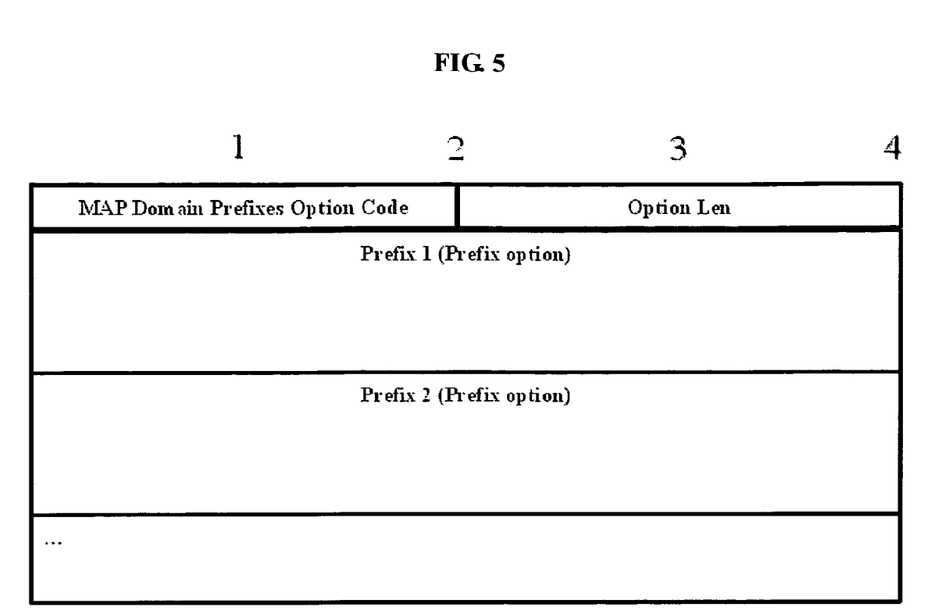
FIG. 5 illustrates MAP domain prefixes option an exemplary embodiment of the present invention.
Figure 6:
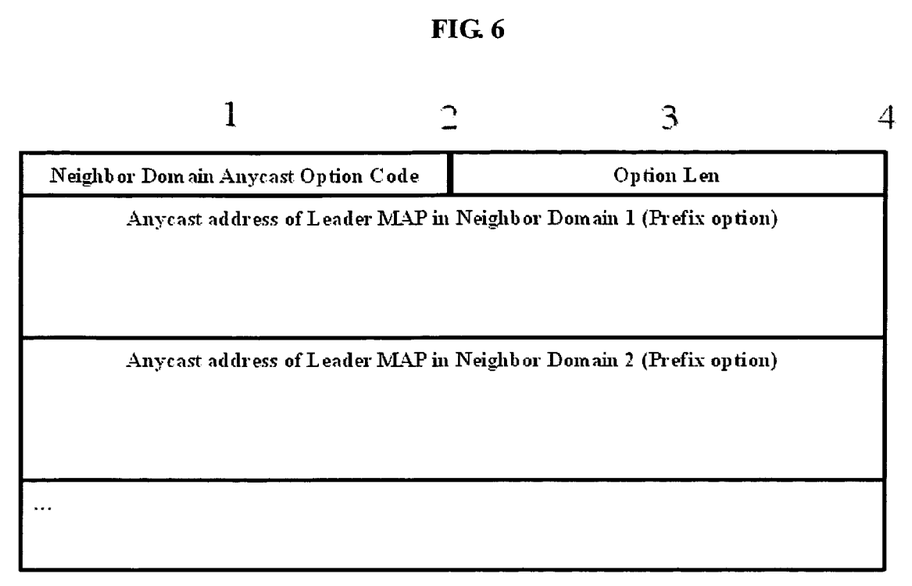
FIG. 6 illustrates neighbor domain anycast option an exemplary embodiment of the present invention.
Figure 7:
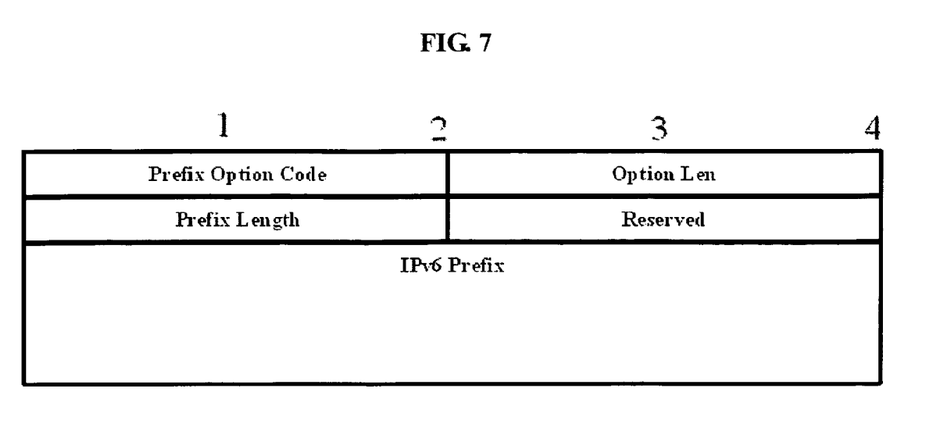
FIG. 7 illustrates prefix option an exemplary embodiment of the present invention.

This option is used to carry Leader MAP's anycast address, list of valid on-link prefixes of border ARs and anycast addresses of Leader MAPs in neighboring MAP domains. The format of this option is shown in FIG. 3. The different fields in the option are explained below.
  MAP Domain Info Option Code=OPTION_MDIOC
  Option Len=Number of bytes in the option, excluding the Option Code and Option Len fields
  MAP Domain Anycast Option=Carries anycast address of Leader MAP
  MAP Domain Prefixes Option=Carries list of valid onlink prefixes of border ARs
  Neighbor Domain Anycast Option=Carries anycast addresses of Leader MAPs in all neighbor domains MAP Domain Anycast Option This option is used to carry the Anycast Address of Leader MAP in a MAP Domain. The format of this option is shown in FIG. 4. The different fields in the option are explained below.
  MAP Domain Anycast Option Code=OPTION_MDAOC
  Option Len=Number of bytes in the option, excluding the Option Code and Option Len fields
  Leader MAP's anycast address=Anycast address that Leader MAP should assign itself MAP Domain Prefixes Option This option is used to carry the list of valid prefixes of border ARs in a MAP Domain. The format of this option is shown in FIG. 5. The different fields in the option are explained below.
  MAP Domain Prefixes Option Code=OPTION_MDPOC
  Option Len=Number of bytes in the option, excluding the Option Code and Option Len fields
  Prefix 1, Prefix 2 etc=Valid on-link prefix of border ARs in the MAP domain that can be used by Mobile Nodes to configure LCoAs Neighbor Domain Anycast Option This option is used to carry anycast address of "Leader MAPs" in neighboring MAP Domains. The format of this option is shown in FIG. 6. The different fields in the option are explained below.
  Neighbor Domain Anycast Option Code=OPTION_NDAOC Option Len=Number of bytes in the option, excluding the Option Code and Option Len fields
  Anycast addr 1, Anycast addr 2 etc=Anycast addresses of Leader MAPs in neighboring MAP domains Prefix Option This option is used to carry an IPv6 prefix. The format of this option is shown in FIG. 7. The different fields in the option are explained below.
  Prefix Option Code=OPTION_POC
  Option Len=18
  Prefix Length=Length for this prefix in bits
  Reserved=Reserved for future use
  IPv6 Prefix=An IPv6 prefix Security Considerations There are 3 message exchanges in the method.
  1) DHCPV6 Info-Req and Info-Response to get MAP-LCoA option
  2) Unicast messages from "Leader MAP" to "Leader MAPs" in neighboring domains
  3) Multicast message from "Leader MAP" in neighboring domains to other MAPs in the same domain The DHCPv6 messages are secured through Delayed Authentication protocol. Also, DHCPV6 server is assumed to be in the same administrative domain as the MAP obtaining information from it. Hence the first message exchange can be considered to be secure. The second and third message exchanges should be secured with IPSec. It should be noted that the destination address in IPSec SA can be a multicast address.

Effects/Advantage(s) of an exemplary embodiment of the present invention

The following are advantages of exemplary embodiment of the present invention.

- All the MAPs within a MAP domain need not be configured with the prefix list. The list is configured only at one place, in the DHCPv6 server.
- For a MAP domain, if there are p prefixes (for border ARs) within the Domain and there are n neighboring domains, manual configuration requires p prefixes to be configured in n domains. In our method, p prefixes are configured at only one domain.
- When the list of valid on-link prefixes at a MAP domain changes (for example, site-renumbering), it has to be changed in only one place, at the DHCPv6 server.

The foregoing description of illustrated an exemplary embodiment of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to certain exemplary embodiments thereof, a latitude of modification, various changes and substitutions are intended in the foregoing disclosures, and it will be appreciated that in some instances some features of exemplary embodiments of the present invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to certain embodiments disclosed as the best mode contemplated for carrying out this invention, but that the invention will include any and all embodiments falling within the scope of the appended claims and their equivalents.

GLOSSARY OF THE TERMS AND DEFINITIONS THEREOF

MIPv6—Mobility Support for IPv6 (rfc3775.txt)

Mobile IPv6 (MIPv6) is a protocol developed as a subset of Internet Protocol version 6 to support mobile connections. MIPv6 is an update of the Internet Engineering Task Force. Mobile IP standard designed to authenticate mobile devices (known as mobile nodes) using IPv6 addresses.

HMIPv6—Hierarchical Mobile IPv6 mobility management (draft-ietf-mipshop-hmipv6-04.txt):

Hierarchical Mobile IPv6 (HMIPv6) is the proposed enhancement of Mobile Internet Protocol versions 6 that is designed to reduce the amount of signaling required and to improve handoff speed for mobile connections. HMIPv6 is a proposed standard from the Internet Engineering Task Force. HMIPv6 adds another level, built on MIPv6 that separates local from global mobility. In HMIPv6, global mobility is managed by the MIPv6 protocols, while local handoffs are managed locally.

MN—Mobile Node:

A node that can change its point of attachment from one link to another, while still being reachable via its home address.

MAP—Mobility Anchor Point:

A Mobility Anchor Point is a router located in a network visited by the mobile node. The MAP is used by the MN as a local HA. One or more MAPs can exist within a visited network.

MAP Option:

It is an option included in Router Advertisement message to propagate MAP's address for dynamic MAP discovery and RCoA construction. This option includes the distance vector from the mobile node (which may not imply the real distance in terms of the number of hops), the preference for this particular MAP, the MAP's global IP address and subnet prefix.

Leader MAP:

A particular MAP in a MAP domain that is the only one of its kind in the domain and is uniquely identifiable based on some unambiguous attribute value. For example, a MAP with the largest distance in the "dist" field of MAP option (defined in draft-ietf-mipshop-hmipv6-04.txt).

AR:

It is the Mobile Node's default router. The AR aggregates the outbound traffic of mobile nodes.

DHCPv6—Dynamic Host Configuration Protocol for IPv6 (RFC3315)

The Dynamic Host Configuration Protocol for IPv6 (DHCPV6) enables DHCPV6 servers to pass configuration parameters such as IPv6 network addresses to IPv6 nodes. It offers the capability of automatic allocation of reusable network addresses and additional configuration flexibility. This protocol is a stateful counterpart to "IPv6 Stateless Address Autoconfiguration" (RFC 2462), and can be used separately or concurrently with the latter to obtain configuration parameters.

Home Address:

A unicast routable address assigned to a mobile node, used as the permanent address the mobile node. This address is within the mobile node's home link. Standard IP routing mechanisms will deliver packets destined for a mobile node's home address to its home link. Mobile nodes can have multiple home addresses, for instance when there are multiple home prefixes on the home link.

CoA—Care-of-address:

A unicast routable address associated with a mobile node while visiting a foreign link; the subnet prefix of this IP address is a foreign subnet prefix.

Among the multiple care-of addresses that a mobile node may have at any given time (e.g., with different subnet prefixes), the one registered with the mobile node's home agent for a given home address is called its "primary" care-of address.

LCoA—On-link CoA:

The LCoA is the on-link CoA configured on a mobile node's interface based on the prefix advertised by its default router. In "Mobility Support for IPv6" RFC3775 this is simply referred to as the Care-of-address. However, in this memo LCoA is used to be distinguish it from the RCoA.

RCoA—Regional Care-Of Address:

An RCoA is an address obtained by the mobile node from the visited network. The RCoA is an address on the MAP's subnet. It is auto-configured by the mobile node when receiving the MAP option.

IPSec—IP Security

What is claimed is:

1. A method for providing automatic configuration of prefixes at all MAPs in a communication system comprising Mobility Anchor Point (MAP) Domains and within each MAP Domain, a Leader MAP, a DHCPV6 Server and possibly other MAP(s), the method comprises:
   requesting, by the leader MAP for the MAP Domain, MAP Domain info option from the DHCPV6 Server;
   configuring, by the DHCPV6 Server, an anycast address of Leader MAP for that MAP Domain;
   configuring, by the DHCPV6 Server, a list of valid on-link prefixes of border ARs for the MAP Domain;
   configuring, by the DHCPV6 Server, anycast addresses of Leader MAPs in neighboring MAP Domains;
   processing a request for the MAP Domain Info option and sending a reply with the MAP Domain Info option to the Leader MAP by the DHCPV6 Server;
   assigning the anycast address, by the Leader MAP to itself, the anycast address being obtained through the DHCPV6 Server;
   sending, by the Leader MAP, the list of valid on-link prefixes to Leader MAPs in all neighboring MAP domains; and
   multicasting, by the Leader MAP, the prefix list, obtained through the DHCPV6 Server or from other Leader MAPs, to all other MAPs within the domain;
   wherein DHCPv6 options are defined to carry all the configuration information from the DHCPv6 Server where the DHCPv6 options are MAP Domain Info Option, MAP Domain Anycast Option, MAP Domain Prefixes Option, Neighbor Domain Anycast Option, Prefix Option along with Security Considerations.

2. The method of claim 1, wherein every MAP domain is assigned a specific anycast address and well-known MAP multicast address.

3. The method of claim 1, wherein one MAP in every MAP domain is designated as Leader MAP.

4. The method of claim 1, wherein the reply with the MAP Domain Info option contains the anycast address of the Leader MAP.

5. The method of claim 1, wherein the reply with the MAP Domain Info option contains the list of valid on-link prefixes of border ARs in the MAP domain.

6. The method of claim 1, wherein the reply with the MAP Domain Info option contains the anycast addresses of Leader MAPs in neighboring MAP domains.

7. The method of claim 1, wherein the Leader MAP assigns itself the anycast address, when not assigned already.

8. The method of claim 7, wherein the Leader MAP then unicasts the list of prefixes to Leader MAPs in all neighboring MAP domains.

9. The method of claim 8, wherein the Leader MAPs in neighboring domains, in order, multicast the prefixes to their domain's well-known MAP multicast address.

10. The method of claim 1, wherein all MAPs in neighboring MAP domain receive the list of prefixes as the MAPs listen on their domain's well-known multicast address.

11. The method of claim 1, wherein all MAPs within a given MAP domain receive the list of valid on-link prefixes of ARs in all other neighboring MAP domains.

12. The method of claim 1, wherein all MAPs combine all the prefixes to form the list of valid on-link prefixes of border ARs in all neighboring MAP domains.

13. The method of claim 1, wherein the option of MAP Domain Info Option is used to carry Leader MAP's anycast address, a list of valid on-link prefixes of border ARs and anycast addresses of Leader MAPs in neighboring MAP domains.

14. The method of claim 1, wherein the option of MAP Domain Info Option comprises fields including MAP Domain Info Option Code which indicates OPTION MDIOC, Option Len which indicates a number of bytes in the option, excluding the Option Code and Option Len fields, MAP Domain Anycast Option which carries anycast address of Leader MAP, MAP Domain Prefixes Option which carries a list of valid onlink prefixes of border ARs and Neighbor Domain Anycast Option which carries anycast addresses of Leader MAPs in all neighbor domains.

15. The method of claim 1, wherein the option of MAP Domain Anycast Option is used to carry the Anycast Address of Leader MAP in a MAP Domain.

16. The method of claim 1, wherein the option of MAP Domain Anycast Option comprises fields including MAP Domain Anycast Option Code which indicates OPTION MDAOC, Option Len which indicates the number of bytes in the option, excluding the Option Code and Option Len fields and Leader MAP's anycast address which indicates Anycast address that the Leader MAP assigns itself 17. The method of claim 1, wherein the option of MAP Domain Prefixes Option is used to carry the list of valid prefixes of border ARs in a MAP Domain.

18. The method of claim 1, wherein the said option of MAP Domain Prefixes Option comprises fields including MAP Domain Prefixes Option Code which indicates OPTION MDPOC, Option Len which indicates the number of bytes in the option, excluding the Option Code and Option Len fields and a plurality of Prefixes which indicates Valid on-link prefix of border ARs in the MAP domain that is used by Mobile Nodes to configure LCoAs.

19. The method of claim 1, wherein the option of Neighbor Domain Anycast Option is used to carry anycast address of "Leader MAPs" in neighboring MAP Domains.

20. The method of claim 1, wherein the option of Neighbor Domain anycast Option comprises fields including Neighbor Domain Anycast Option Code which indicates OPTION NDAOC, Option Len which indicates number of bytes in the option excluding the Option Code and Option Len fields and a plurality of Anycast address which indicates Anycast addresses of Leader MAPs in neighboring MAP domains.

21. The method of claim 1, wherein the option of Prefix Option is used to carry an IPv6 prefix.

22. The method of claim 1, wherein the option of Prefix Option comprises fields including Prefix Option Code which indicates OPTION POC, Option Len which equals 18 bytes, Prefix Length which indicates Length for this prefix in bits, Reserved field which a field indicates reserved for future use, and Ipv6 Prefix which is an IPv6 prefix.

23. The method of claim 1, wherein the Security Considerations comprises three message exchanges including DHCPV6 Info-Req and Info-Response to get MAP-LCoA option, Unicast messages from Leader MAP to Leader MAPs in neighboring domains and Multicast message from Leader MAP in neighboring domains to other MAPs in the same domain.

24. The method of claim 1, wherein DHCPv6 messages are secured through Delayed Authentication protocol and the DHCPV6 server is in the same administrative domain as the MAP obtaining information from the DHCPv6 Server.

25. The method of claim 1, further comprising:
configuring the Leader MAP's anycast address, the list of valid on-link prefixes of border ARs and the anycast addresses of Leader MAPs of neighboring MAP Domains in the MAP Domain Info option.

26. The method of claim 1, further comprising:
configuring the anycast address of Leader MAP for the MAP Domain in MAP Domain Anycast option.

27. The method of claim 1, further comprising:, configuring the list of all valid prefixes of border ARs within the MAP Domain in MAP Domain Prefixes option.

28. The method of claim 1, further comprising:
configuring anycast addresses of Leader MAPs in neighboring MAP Domains in Neighbor Domain Anycast option.

29. The method of claim 1, wherein the requesting MAP Domain Info option comprises Leader MAP sending DHCPV6 Info-Request message and receiving DHCPV6 Info-Reply.

30. The method of claim 1, wherein the method further comprises Leader MAP assigning itself the anycast address contained in MAP Domain Anycast option.

31. The method of claim 1, wherein the sending list of valid on-link prefixes comprises:
extracting anycast addresses of Leader MAPs in neighboring MAP Domains from Neighbor Domain Anycast option;
extracting the list of valid on-link prefixes of border ARs in the MAP Domain from MAP Domain Prefixes option ; and
sending the prefix list to anycast addresses of Leader MAPs of neighbor MAP Domains.

32. The method of claim 1, wherein in the communication system, a method wherein the Leader MAP is determined as one with largest distance in dist field of MAP option.

33. The method of claim 1, further comprising:
joining, by the other MAPs, the well-known multicast address for its MAP Domain; and
receiving, by the other MAPs, the prefix lists from their Leader MAP and storing the prefix lists.

* * * * *